May 26, 1942.  W. T. KNAUTH  2,284,060
MEANS FOR MEASURING AND RECORDING LIQUID DENSITY
Filed June 16, 1941   2 Sheets-Sheet 1
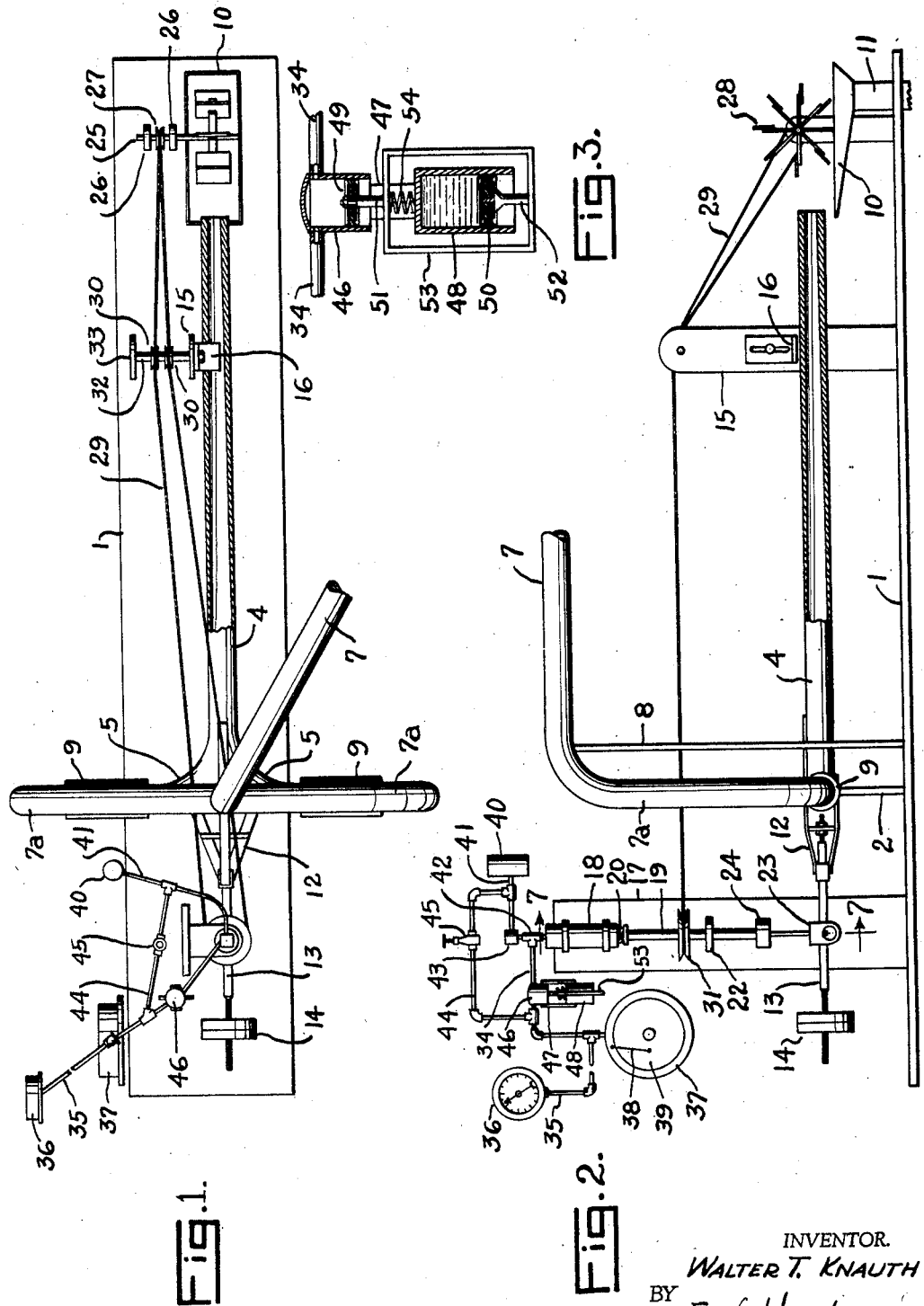
INVENTOR.
WALTER T. KNAUTH
BY E. V. Hardway
ATTORNEY May 26, 1942. W. T. KNAUTH 2,284,060
MEANS FOR MEASURING AND RECORDING LIQUID DENSITY
Filed June 16, 1941 2 Sheets-Sheet 2

INVENTOR.
WALTER T. KNAUTH
BY
E. V. Hardway
ATTORNEY

Patented May 26, 1942

2,284,060

UNITED STATES PATENT OFFICE 2,284,060

MEANS FOR MEASURING AND RECORDING LIQUID DENSITY

Walter T. Knauth, Houston, Tex.

Application June 16, 1941, Serial No. 398,190

5 Claims. (Cl. 265—44)

This invention relates to means for measuring and recording liquid density.

An object of the invention is to provide equipment of the character described specially designed to continuously indicate and record the density of flowing liquid; the invention is particularly applicable for continuously indicating and recording mud laden drilling fluid as it flows from the well being drilled.

As hereinabove indicated, drilling fluid is laden with mud and is pumped through the drill stem and allowed to return to the surface between the drill stem and the well bore. This drilling fluid is essential in the drilling of wells with rotary equipment and is used for the purpose of carrying to the surface the cuttings from the drill; for supporting the walls of the well bore and for restraining high pressure fluids encountered in the well which might, otherwise, cause a blowout. The weight, or density, of this drilling fluid is one of its most important characteristics and it is very important that the driller be constantly aware of the density of the drilling fluid.

One of the prime objects of the present invention is to provide equipment of the character described which will automatically and continuously determine the density of the drilling fluid and indicate said density to the driller on the derrick floor as well as continuously make a record of said density for permanent use of those in charge of drilling operations.

Another object of the invention is to provide equipment of the character described which is very accurate and which at the same time is of simple construction and may be readily installed.

With the above and other objects in view the invention has particular relation to certain novel features of construction, operation and arrangement of parts, an example of which is given in this specification and illustrated in the accompanying drawings, wherein:

Figure 1 shows a plan view of the machine.

Figure 2 shows a side elevation partly in section.

Figure 3 shows an enlarged sectional view of a temperature compensator employed.

Figure 6:
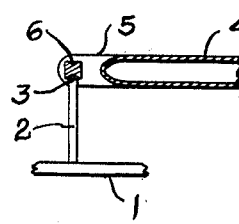
Figure 6 shows a fragmentary sectional view taken on the line 6—6 of Figure 5.
Figure 7:
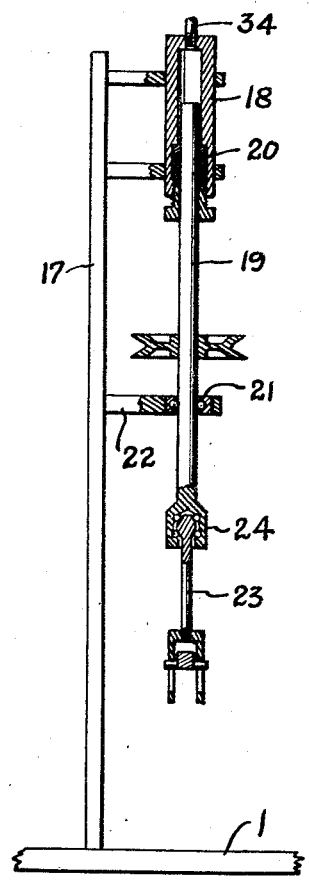
Figure 7 shows an enlarged fragmentary side elevation, partly in section, taken on the line 7—7 of Figure 2.
Figure 8:
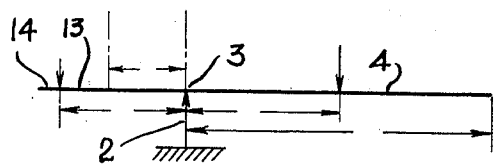
Figure 8 shows a schematic diagram.

Referring now more particularly to the drawings wherein like numerals of reference designate the same parts in each of the figures, the numeral 1 designates the base upstanding from which is a fulcrum 2 whose upper end terminates in a knife edge 3 on which the balance tube 4 is mounted to pivot. At one end this balance tube may be formed with a T-connection 5 and its other end is free, the passageway through the balance tube being gradually contracted toward its discharge end, as shown in Figure 2, so that the tube will be constantly full of the liquid flowing therethrough. The branches of the T are connected by a cross-bar 6 having a longitudinal V-groove in its underside to receive the knife edge 3 as shown in Figure 6, said V-groove and knife edge extending at right angles to the longitudinal axis of the tube 4 to the end that said tube will be nicely balanced.

Figure 4:
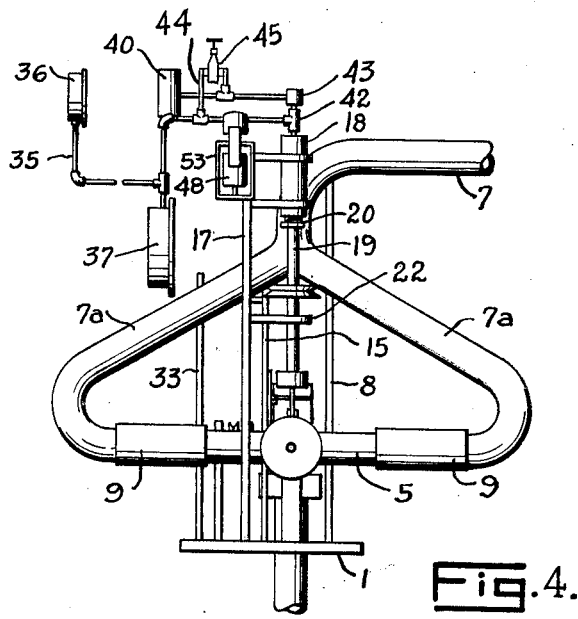
Figure 4 shows an end view of the machine.
Figure 5:
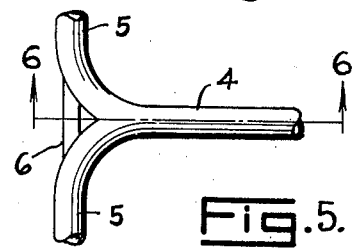
Figure 5 shows a fragmentary plan view.

There is an inlet line 7 which is supported above the base 1 by the supporting standard 8 and this inlet line 7 divides into the branches 7a, 7a whose free ends are inwardly turned, as shown in Figure 4, and connected to the T-connections 5 by means of the hose 9, 9 which are of such flexibility as to offer a minimum resistance to the movement of the balance tube 4. The fluid to be tested enters the inlet line 7 from any suitable source such as from the outflow line from the well, the casing head or the ditch through which the drilling fluid flows and passes through the branches 7a, 7a, the hose connections 9, 9 and flows on through the balance tube 4 and is discharged therefrom into the trough 10 and passes thence through the discharge line 11 flowing back to the circulating system for the drilling fluid.

Suitably anchored to the pivoted end of the balance tube 4 there is a frame 12 and adjustably mounted in this frame there is an arm 13, aligned with said tube and whose free end is threaded to receive the counterbalancing weights 14 which are threaded thereon for adjustment. These counterbalancing weights may be adjusted as desired to balance the weight of the tube 4, and its appendants, plus a part of the weight of the fluid flowing through said tube; so that the pressure range on the gauges will be reflected only by liquid having a higher density than that balanced out by the weights 14.

Upstanding from the base 1, alongside the tube 4 there is a standard 15 having a vertically adjustable stop 16 mounted thereon which extends over the tube 4 to limit the upward movement of the free end thereof.

While the equipment is in operation the drilling fluid will be constantly flowing through the tube 4 into the trough 10 and said tube will be kept constantly filled with said fluid so that the volume of fluid in the tube will remain constant.

Upstanding from the base 1, there is a supporting standard 17 to the upper end of which a vertical cylinder 18 is secured. Working in the cylinder 18 there is a plunger 19 and surrounding said plunger and carried by the lower end of the cylinder there is a stuffing box 20 forming a seal between the plunger and the cylinder. The plunger is rotatable as well as capable of vertical movement and is mounted for rotation in the bearings 21 of the bracket 22 which is fixed to the standard 17. The lower end of the plunger 19 is connected to a rod 23 by means of a self-aligning thrust bearing 24 and the lower end of the rod 23 has a pivotal connection with the lever arm 13. Accordingly, as the balance tube moves up or down, the plunger 19 will also be moved, the movement of the plunger being in a direction opposite to that of the tube 4.

There is a transverse shaft 25 mounted to rotate in the bearing members 26, 26, upstanding from the base 1. Between said bearing members 26 the shaft 25 has a pulley 27 fixed thereon. The shaft 25 extends across the trough 10 and has a pelton wheel 28 thereon designed to be turned by the liquid being discharged from the balance tube 4. An endless belt 29 operates over the pulley 27 and over pulleys 30, 30 and over a pulley 31, the latter being fixed on the plunger 19. The pulleys 30 are loosely mounted on a transverse shaft 32 which is supported by the standards 15 and 33 upstanding from the base 1. The plunger 19 is therefore turned as it moves up and down so that it will move with more freedom through the stuffing box 20. The upper end of the cylinder 18 is connected, through the pipes 34 and 35, with a pressure gauge 36 and is also connected, through the pipe 34 with a conventional pressure recorder 37, through the stylus 38 of which a permanent record may be made on the chart 39. The units of density may be indicated by the gauge 36 and recorded on the chart 39 in pounds per gallon, pounds per cubic foot, specific gravity or any other unit of density desired by the individual operator. The cylinder 18 and the piping connected therewith may be filled with a suitable liquid such as glycerine. As the density of the drilling fluid flowing through the tube 4 varies the horizontal position of said tube will accordingly vary resulting in variations in the movement of the plunger 19 and the pressure of the liquid in the cylinder 18, said variations being indicated by the gauge 36 and recorded on the chart 39.

The numeral 40 designates a reserve container which is connected into the top of the cylinder 18 by means of the pipe 41 and the T 42. The pipe 41 has a conventional back-pressure valve 43 therein. This container 40 and the pipe 41 are also filled with glycerine. When the tube 4 is empty and is in zero position against stop 16, if there has been any liquid loss in the pressure system there will be a vacuum in the cylinder 18. In order that the system may be kept completely filled with liquid the reserve container 40 has been provided, the back-pressure valve 43 opening upon creation of such vacuum to replenish the loss. Should the system, for any reason, accumulate too much liquid, the excess may flow back to the reservoir 40 through the by-pass pipe 44 which is connected at one end into the pipe 34 and at its other end into the pipe 41 and which is equipped with a conventional needle valve assembly 45 for controlling the flow of liquid through said by-pass pipe.

Incorporated into the pipe 34 there is a cylinder 46 and beneath this cylinder and anchored thereto by the brackets 47 there is another cylinder 48. Reciprocable in these respective cylinders are the pistons 49 and 50. The piston 49 is attached to a piston rod 51 which is also attached to a frame 53. Upstanding from the lower end of the frame there is a stop 52 on which the piston 50 normally rests. The cylinder 46 is filled with glycerine which forms a part of the pressure system for operating the gauges. The cylinder 48 is also filled with glycerine. In the illustration shown, the volume of liquid in the cylinder 48 is the same as the volume of liquid in the liquid pressure system and the areas of the pistons 49 and 50 are the same. These cylinders, pistons and their connections form a temperature compensator. As the atmospheric temperature increases the volume of the fluid in the cylinder 48 increases thereby forcing the piston 50 downwardly causing a corresponding downward movement of the frame 53 and the piston 49 connected thereto, thus decreasing the volume of liquid in the cylinder 46 to allow for the expansion of the liquid in the system due to an increase in temperature thereof. Upon such downward movement of the frame 53 the spring 54, interposed between the upper end of the frame and the cylinder 48, will be compressed.

Upon a reduction in atmospheric temperature the compression spring 54 will force the frame 53, as well as both pistons 49 and 50, upwardly so as to decrease the capacity of the cylinder 46 in proportion to decrease in volume of the liquid in the pressure system.

If, for any reason, the balance tube 4 should be manually manipulated up and down so as to cause the cylinder 18 and plunger 19 to act as a pump and to take too much liquid from the reserve container 40 introducing it into the pressure system, the pressure in said system will be relieved by the piston 49 moving downwardly and placing the spring 54 under compression. In this instance the frame 53 will move on downwardly and the stop 52 will move away from the piston 50, said piston 50 remaining stationary with respect to the cylinder 48. Therefore, the stop 52 is unattached to the piston 50, as if it were attached to this piston, the piston would move on downwardly with the frame 53 which would create a vacuum in the cylinder 48 with the possible leakage of air into said cylinder past the piston 50. When this excess volume of liquid is relieved from the system the spring 54 will again move the piston 49 upwardly, the frame 53 and stop 52 moving upwardly also until said stop contacts the piston 50.

The drawings and description are illustrative merely while the broad principle of the invention will be defined by the appended claims.

What I claim is:

1. A device of the character described comprising a balance tube forming a flow conduit for liquid and mounted to oscillate in an approximately vertical plane in accordance with variations in the density of liquid flowing through the tube, a gauge, means including a liquid filled cylinder and a rotatable plunger therein arranged to be actuated by the tube and effective to act against the liquid in the cylinder to actuate the gauge to indicate said variations and means for rotating the plunger while it is so actuated.

2. A device of the character described comprising a balanced tube forming a flow conduit for liquid and mounted to rotate in an approximately vertical plane in response to variations in the density of liquid flowing through the tube, a pressure gauge, a cylinder, a conduit connecting the cylinder with the gauge, liquid in said cylinder and conduit and means including a rotatable piston connected to the tube and arranged to vary the pressure of the liquid in the cylinder in accordance with variations in the movements of the tube and means to rotate the piston.

3. A device of the character described comprising a balanced tube forming a flow conduit for liquid and mounted to vary, in position, by variations in the density of liquid flowing through the tube, a gauge, a cylinder, a conduit connecting the cylinder with the gauge, liquid in said cylinder and conduit, a plunger connected to the tube and operable against the liquid in the cylinder to vary the pressure of said liquid in accordance with the movements of the plunger and means for rotating the plunger.

4. A device of the character described comprising a balance tube forming a flow conduit for liquid and mounted to vary, in position, by variations in the density of liquid flowing through the tube, a gauge, a pressure system including a cylinder and a conduit connecting the cylinder with the gauge with liquid in the cylinder and conduit, means connected to the tube and arranged to vary the pressure of the liquid in said system in accordance with variations in the movements of the tube and a temperature compensator connected with the system and effective to maintain the volume of liquid in the system substantially uniform.

5. A device of the character described comprising a balance tube forming a flow conduit for liquid, a pivotal mounting for the tube allowing the tube to vary in position in accordance with the variations in the density of the liquid flowing through the tube, a liquid supply conduit connected into the tube at the pivotal mounting of the tube and at approximately a right angle to the plane of the tube movement, said supply conduit being formed to allow the tube to move on its mounting, a gauge, a pressure system including a cylinder, a conduit forming a duct connecting the cylinder with the gauge, liquid in said cylinder and duct, means including a rotatable piston connected to the tube and arranged to vary the pressure of the liquid in the system in accordance with the variations in the movements of the tube and a temperature compensator connected with the system and effective to maintain the volume of liquid in the system substantially uniform.

WALTER T. KNAUTH.